Patented Feb. 12, 1924.

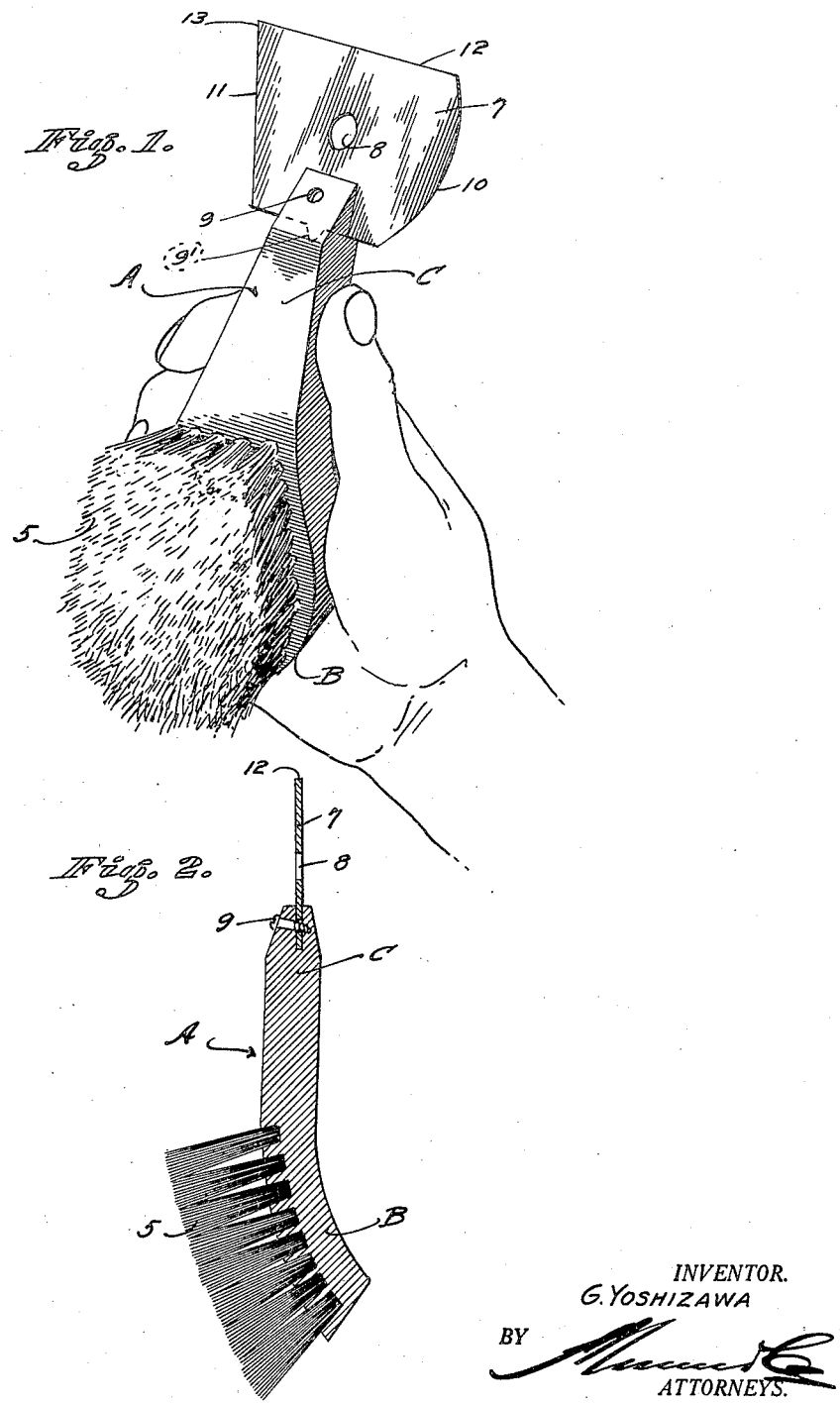

1,483,760

UNITED STATES PATENT OFFICE.

GINJIRO YOSHIZAWA, OF SAN FRANCISCO, CALIFORNIA.

COMBINED BRUSH AND SCRAPER.

Application filed February 10, 1923. Serial No. 618,361.

*To all whom it may concern:*

Be it known that I, GINJIRO YOSHIZAWA, a subject of the Emperor of Japan, and a resident of San Francisco, county of San Francisco, and State of California, have invented a new and useful Combined Brush and Scraper, of which the following is a specification.

My invention relates to a combined brush and scraper and has reference more particularly to a device for scraping and otherwise cleaning refrigerators, gas ranges, stoves, coolers, kitchen cabinets, pots, pans, bath tubs, basins, sinks, screens, and other objects as occasion arises.

The primary object of my invention is to provide a combined brush and scraper which will reach any corners or edges of any of the above or other objects, and effectively scrape off all accumulated grease, dirt, or the like.

A further object of my invention is to so construct the combined brush and scraper that it may be made very cheaply, sold at a nominal cost to the user, and capable of withstanding hard use without sharpening or otherwise repairing the same.

My invention possesses other objects which will appear as the description now proceeds with reference to the accompanying drawings in which Figure 1 is a perspective view of the combined brush and scraper, and Figure 2 is a vertical section of the same.

Referring now to the drawing in detail A represents a brush having the customary bristles (5) in the head B thereof, and with the opposite end of the brush terminating in a tapered and relatively narrow shank C. The head B is curved as best shown in Figure 2 so that the block in which the bristles are imbedded, including the shank, will provide a convenient hand grip as best shown in Figure 1.

Fixed to the end of the shank C is a scraper (7) the same comprising a relatively small, irregularly cut sheet of metal, having an opening (8) preferably in the center thereof so that the device may be hung upon a nail, hook, or the like. The scraper is fixed to the shank C preferably by slitting the end of the shank to receive the thickness of the sheet and utilizing a screw (9), which passes through an opening made to receive it in the thickness of the scraper so that the threaded end of the screw may be imbedded in the shank as best shown in Figure 2. The imbedded end of the scraper has a pointed tongue (9') so as to hold the scraper steady.

The scraper includes three scraping edges, the edge (10) being semi-circular and the other two edges (11) and (12) respectively, being straight edges. The straight edge (11) is cut at an obtuse angle to the edge (12) so as to leave a relatively sharp pointed corner (13) at the meeting ends of the two edges.

The three cutting edges thus provided leave the scraper capable of accommodating itself to most any angular corner or rounded surface that will need to be cleaned in ordinary household kitchen equipment.

The bristles (5) instead of being positioned in the head B may be continued along the shank if desirable.

I claim:

In a brush, a hand grip and a scraper fixed to the end of the hand grip, said scraper having three scraping edges, one edge being semi-circular and the other two being straight edges, one of the straight edges being cut at an obtuse angle to the other straight edge and extending inwardly toward one side of said hand grip to leave a relatively sharp pointed corner at the meeting ends of the two edges, the grip having one end kerfed and receiving said scraper and said scraper being provided with a pointed projection which is driven in the grip axially thereof and a single fastening device securing the scraper to said grip and serving to hold said projection in said grip and the blade against rocking thereon.

GINJIRO YOSHIZAWA.